United States Patent [19]

Bepko

[11] 4,450,563
[45] May 22, 1984

[54] RAPIDLY TUNABLE LASER SYSTEM

[75] Inventor: Stephen J. Bepko, Catonsville, Md.

[73] Assignee: Westinghouse Electric Corp., Pittsburgh, Pa.

[21] Appl. No.: 371,100

[22] Filed: Apr. 23, 1982

[51] Int. Cl.$^3$ .............................................. H01S 3/10
[52] U.S. Cl. .................................... 372/23; 372/27; 372/106
[58] Field of Search .................. 372/20, 23, 27, 102, 372/106, 108

[56] References Cited

U.S. PATENT DOCUMENTS

| | | | |
|---|---|---|---|
| 3,564,454 | 2/1971 | Hook et al. | 372/106 |
| 3,790,898 | 2/1974 | Gudmundsen | 372/20 |
| 3,857,109 | 12/1974 | Pilloff | 372/23 |
| 3,918,007 | 11/1975 | Waksberg | 372/27 |
| 3,938,058 | 2/1976 | Yamamoto | 372/23 |
| 3,959,739 | 5/1976 | Hutcheson et al. | 372/20 |
| 3,983,507 | 9/1976 | Tang et al. | 372/20 |
| 3,991,383 | 11/1976 | Hughes | 372/20 |
| 4,122,412 | 10/1978 | Hughes | 372/20 |
| 4,241,318 | 12/1980 | Comera wet al. | 372/23 |

*Primary Examiner*—James W. Davie
*Attorney, Agent, or Firm*—W. E. Zitelli

[57] ABSTRACT

A rapidly tunable laser system which is operative to tune the laser beam emission to a predetermined wavelength in accordance with the polarization state thereof is disclosed. The laser beam emission may be tuned between predetermined wavelengths as rapidly as it can be altered between polarization states. More specifically, the laser system includes a polarization modulator for modulating the radiation beam emitted from a laser cell between at least two polarization states, and at least two diffraction gratings which are uniquely and fixedly aligned to specularly reflect and retroreflect radiation incident thereupon. The retroreflected radiation is of a wavelength uniquely identified with the angle of incidence of the corresponding diffraction grating. One diffraction grating retroreflects radiation at one wavelength and response to one polarization state of the radiation beam, and the other diffraction grating retroreflects radiation at another wavelength in response to radiation at another polarization state. Hence, the laser system may be tuned between the one and another wavelengths by modulating the radiation beam between the one and another polarization states by the polarization modulator. The laser beam emission may be tuned between the predetermined wavelengths as rapidly as it can be altered between the polarization states.

8 Claims, 3 Drawing Figures

RAPIDLY TURNABLE LASER SYSTEM

BACKGROUND OF THE INVENTION

The present invention relates to tunable lasers, in general, and more particularly to a rapidly tunable laser system operative to tune the laser beam emission to a predetermined wavelength in accordance with the polarization state thereof, whereby the laser beam emission may be tuned between predetermined wavelengths as rapidly as it can be altered between polarization states.

Recent target recognition systems are measuring atmospheric pollution for the purposes of detecting and classifying certain targets. These systems generally include a laser system having emissions which are alternately tunable between at least two frequencies, preferably widely separated in wavelength. For the cases in which effluents are measured as the atmospheric pollution, one laser beam emission wavelength may be tuned to the center of the absorption line of an effluent of interest, while another laser beam emission wavelength may be tuned to a reference line whose attenuation is virtuely unaffected by the presence or absence of the effluent to be measured. In order to minimize the effects of atmospheric disturbances, like turbulence, for example, the laser beam emissions of the one and another wavelengths should be pulsedly transmitted alternately as closely spaced in time as possible. Additional minimum pulse repetition rate requirements may be imposed in military applications where fast acquisition and detection times are mandatory to avoid detection by an enemy in a hostile environment.

Tunable laser systems which have been developed over the past several years typically use mechanically movable intracavity elements such as diffraction gratings, prisms or etalons, for example, as the frequency tuning elements. Representative movable element tunable laser systems are disclosed in the U.S. Patents listed directly herebelow:

U.S. Pat. No. 3,983,507 issued to Tang et al. on Sept. 28, 1976 and entitled "Tunable Laser Systems and Method";

U.S. Pat. No. 3,983,058 issued to Yamamoto on Feb. 10, 1976 and entitled "Tunable Laser";

U.S. Pat. No. 3,857,109 issued to Pilloff on Dec. 24, 1974, and entitled "Longitudinally-Pumped Two-Wavelength Lasers"; and U.S. Pat. No. 3,790,898 issued to Gudmundsen et al. on Feb. 5, 1974, and entitled "Selectively Tunable Gaseous Laser".

In the laser systems represented by the referenced patents hereabove, the tuning of the laser beam emission from one frequency to another requires the physical mechanical motion of one or more of the intracavity elements of the laser system. The physical motion of an element from one position to another usually cannot be brought about rapidly and thus is a primary limitation to the rate of tuning. Another disadvantage of the mechanical scanning of an intracavity element is that adjacent laser lines (i.e. specific wavelengths emitted by the laser) cannot be skipped over in the tuning process between widely separated desired wavelengths. As a result, unwanted wavelengths may be emitted from the laser system which could possibly alter or confuse the precision analytical measurements being derived. In addition, physical motion of the intracavity elements are known to frequently result in both amplitude and frequency instabilities of the laser beam emission which may further contribute to the inaccuracies of the precision measurements taking place.

Other laser systems which do not use movable intracavity elements in the tuning process generally include an optical device which is responsive to either acoustic, electric or magnetic inputs to deflect the laser beam from the optical axis of the laser cavity to an angle of incidence with a reflective device, normally a diffraction grating, the incident angle being governed by the input signal of the diffraction cell. In these laser systems, the reflecting device is designed to retroreflect laser radiation of a unique wavelength dependent on the angle of incidence thereof.

Examples of laser systems employing non-movable intracavity optical elements for tuning between specific laser beam wavelengths are disclosed in the following U.S. Patents:

U.S. Pat. No. 4,122,412 issued to Hughes on Oct. 24, 1978, and entitled "Magneto-Optically Tuned Lasers";

U.S. Pat. No. 4,028,636 issued to Hughes on June 7, 1977, and entitled "Acousto-Optical Deflector Tuned Organic Dye Laser";

U.S. Pat. No. 3,991,383 issued to Hughes on Nov. 9, 1976, and entitled "Franz-Keldysh Effect Tuned Laser"; and U.S. Pat. No. 3,959,739 issued to Hughes et al on May 25, 1976, and entitled "Electro-Optic Tuning of Organic Dye Laser".

In these references, the tuning operation involves physically deflecting the radiation beam to strike different portions of the tuning or reflective optical element at corresponding angles of incidence (i.e. for each wavelength desired, a different portion of the tuning optical element is used for retroreflection). Needless to say, this technique requires a uniform fabrication process in making the tuning optical element, especially over the surface area which is used by the radiation beam, to ensure a uniform optical response.

The laser system described in the specification herebelow overcomes the undesirable and disadvantageous aspects of the aforementioned laser systems and provides rapid tuning between preselected laser beam wavelengths.

SUMMARY OF THE INVENTION

In accordance with the present invention, a laser system which is rapidly tunable between at least two preselected laser wavelengths comprises a lasing cell having two ends and operative to admit a coherent beam of radiation therefrom along an optical path; a mirror optically separated from one end of the lasing cell along the optical path for reflecting the radiation beam back along the optical path to the lasing cell; means operative to rapidly modulate the emitted radiation beam between at least two polarization states; and first and second reflecting means. The first reflecting means is optically separated from the other end of the lasing cell along the optical path and is fixedly aligned to have a first predetermined incident angle with the polarized radiation beam. The first reflecting means is operative in response to incident radiation in one polarization state to retroreflect a first portion of the radiation beam at substantially one wavelength which is unique to the first predetermined incident angle and to specularly reflect a second portion of the radiation beam along a first path. The first reflecting means is also operative in response to incident radiation in another polarization state to specularly reflect the radiation beam along the first path. The second reflecting means is optically separated from the first reflecting means along the first path and is fixedly aligned to have a second predetermined incident angle with the radiation beam reflected along the first path. The second reflecting beam is operative in response to incident radiation in the other polarization state to retroreflect a third portion of the radiation beam at substantially another wavelength which is unique to the second predetermined incident angle and to specularly reflect a fourth portion of the radiation beam along a second path. The second reflecting means is also operative in response to incident radiation in the one polarization state to specularly reflect a fifth portion of the radiation beam along the second path. The retroreflected first and third portions of the radiation beam are each sufficient to cause resonance at the one and another wavelength respectively, whereby when the emitted radiation is modulated in the one polarization state the laser system is tuned to the one wavelength and when the emitted radiation is modulated in the other state the laser system is tuned to the other wavelength and whereby the modulating means is operative to rapidly modulate therebetween.

More specifically, the first and second reflective means may comprise first and second diffraction gratings, respectively wherein each diffraction grating may have a reflective surface of a multiplicity of grooves having a predetermined groove spacing based on the prespecified wavelength to be retroreflected thereby. The first diffraction grating is aligned to have the reflective surface normal thereof angled at the first predetermined incident angle to the optical path incident thereupon. The second diffraction grating is aligned to have the reflective surface normal thereof angled at the second predetermined incident angle to the first path incident thereupon. In this embodiment, the modulating means includes means for modulating the radiation beam in one polarization state which is orthogonal to the grooves of the first diffraction grating and parallel to the grooves of the second diffraction grating, and in another polarization state which is parallel to the grooves of the first diffraction grating and orthogonal to the grooves of the second diffraction grating. Moreover, the mirror is a totoal reflective mirror and the output emission path of the laser system is along the second path.

DESCRIPTION OF THE PREFERRED EMBODIMENTS

Figure 1:
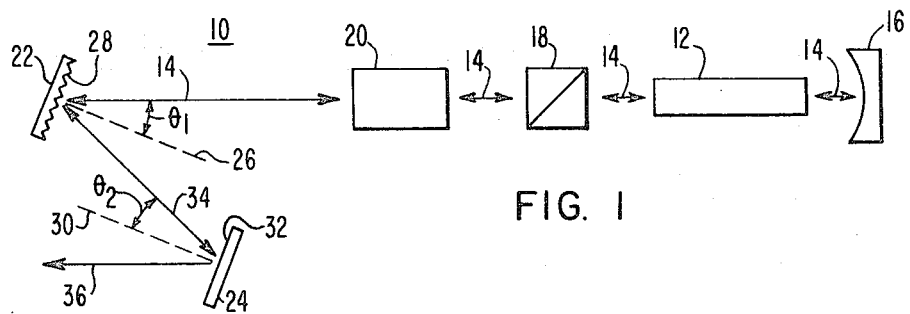
FIG. 1 is a block diagram optical schematic of a laser system suitable for embodying the present invention.

Referring to FIG. 1, a conventional lasing cell 12 is disposed in a laser or resonant cavity 10 for emitting a coherent radiation beam along an optical axis 14. The lasing cell 12 typically includes a lasing medium and associated conventional electronics for excitation of the lasing medium, like power supplies, ... etc. In the present embodiment, a gaseous medium, like $CO_2$, for example, may be used as the lasing medium in which case there is no "preferred" direction of polarization as might occur in lasers having a crystal medium, for example. Consequently, a simple $CO_2$ laser lases unpolarized or "randomly polarized" light. However, it is understood that any lasing medium, such as dye, molecular gas, solid state, ... and the like, for example, which is capable of being operated at at least two distinct wavelengths is suitable for use in the present embodiment without deviating from the principles of the present invention.

Optically separated from one end of the lasing cell 12 along the optical axis 14 may be a conventional reflective mirror 16. In the present embodiment, the mirror 16 may be totally reflective and of a concave design for providing mode stability. On the other end of the lasing cell 12 along the optical axis 14 may be provided a polarizer 18 which may be of a conventional variety, such as glan, wire grid, or the like. In the present embodiment, the polarizer 18 is a Brewster angle window which may be fabricated from any material that is transmissive in the wavelength regions of interest, like NaCl, for example. The window 18 may be disposed on the end of the laser cell or tube 12 itself. It is understood that should the lasing cell 12 have a very high gain (i.e. affinity to lase) at one polarization over another, then the polarizing element 18 would not be required. Otherwise, the polarizer 18 is normally embodied as part of the laser system embodiment.

Cascadedly disposed along the optical axis 14 with the polarizer 18 is a polarization modulator device 20. In the present embodiment, the device 20 utilizes the electro-optic effect in a crystal such as Cadmium Telluride, for example. A typical device of this type normally referred to as a Pockels cell is manufactured by II-VI, Inc., of Saxonburg, PA. under the model No. EOS-5. Another device also suitable for use as a polarization modulator is a Kerr cell which uses an electro-optic effect in liquids. In fact, any device which is operative to alter the phase of a radiation beam to produce the effect of polarization modulation is suitable for use in the present embodiment. Preferably, however, the Pockels cell 20 is designed to switch the polarization of the laser beam between the σ-and p- polarization states, which are orthogonal to one another, and to operate in the wavelength band of interest.

At least two other optical reflective devices 22 and 24 are also disposed in the laser intracavity 10. Both optical reflective devices 22 and 24 have the characteristics of being operative in response to incident radiation of one polarization state to retroreflect a portion of the radiation beam incident thereupon at substantially one wavelength which is unique to the incident angle thereof and to reflect another portion of the incident radiation beam along another path, and being operative in response to incident radiation of another polarization state to reflect the incident radiation beam along the other path. The retroreflected portions of the radiation beam, in each case, are sufficient to cause resonance at the wavelengths respectively and uniquely associated therewith. Accordingly, as the emitted radiation beam is modulated rapidly between polarization states by the polarization modulator 20, the laser system 10 is correspondingly tuned to the prespecified wavelength uniquely indentified with the incident angle of the optical reflective device 22 or 24 which retroreflectively responds to the polarization state.

In the present embodiment, the elements 22 and 24 are diffraction gratings similar to the ML Series manufactured by PTR Optics, Inc., Waltham, Mass. Because of the desired wavelength region of the present embodiment which may be on the order of 5–10 microns, for example, the grating element 22 may have on the reflective surface thereof on the order of 165 grooves per millimeter and the grating element 24 may have on the reflective surface thereof on the order of 150 grooves per millimeter, both ruled over an area of approximately 1 in² (i.e., approximately 6 cm²).

The orientation of the grating elements 22 and 24 with respect to the optical axis 14 in the intracavity 10 determines uniquely the wavelengths that will resonate within the cavity 10. More specifically, the grating element 22 is fixedly aligned such that the normal 26 to the grating surface 28 is at a predetermined incident angle $\theta_1$ to the optical axis 14. Also, the other diffraction grating element 24 is fixedly aligned to have the normal 30 of its grating surface 32 at a predetermined incident angle $\theta_2$ with the diffraction path 34 of the grating element 22. Hence, in this orientation, the plane of $\theta_1$ is perpendicular to the plane of $\theta_2$, the alignment of which being not shown properly in the two-dimensional illustration of FIG. 1. That is, laser radiation reflecting from the grating element 24 along the path 36 is actually coming out of the plane of the illustration. In summary then, the grating elements 22 and 24 are provided in the foregoing described alignment to encourage resonance at the preselected wavelengths $\lambda_1$ and $\lambda_2$ in accordance with the incident angles $\theta_1$ and $\theta_2$, respectively thereof.

In order to have resonance at the prespecified wavelengths, retroreflection of the radiation beam at the desired wavelength should be induced at the appropriate diffraction grating 22 or 24. This is accomplished through operation of the polarization modulator 20 in accordance with the orientation of the diffraction gratings 22 and 24 in the embodiment of FIG. 1. Assuming that the surface grooves of the diffraction gratings 22 and 24 are properly aligned with respect to one another, the modulator 20 may, in one condition, control the polarization state of the radiation beam to be orthogonal ($\sigma$) to the grooves of grating 22 and parallel (p) to the grooves of grating 24 in which case radiation of wavelength $\lambda_1$ is retroreflected from grating 22 in sufficient quantity to cause resonance in the laser cavity 10 at the wavelength $\lambda_1$. In another condition, the modulator 20 may control the polarization state of the radiation beam to be parallel (p) to the grooves of grating 22 and orthogonal ($\sigma$) to the grooves of grating 24 in which case radiation of wavelength $\lambda_2$ is specularly reflected from grating 22 and retroreflected from grating 24 to cause resonance in the laser cavity 10 at the wavelength $\lambda_2$. Accordingly, the laser system 10 may be tuned between laser beam wavelengths $\lambda_1$ and $\lambda_2$ as rapidly as the polarization state may be modulated by the modulator cell 20.

It is understood that the diffraction efficiencies of the grating elements 22 and 24 for the $\sigma$- and p-polarization states determine the magnitudes of the feedback and output couplings of the laser system. Theoretically, the general diffraction grating equation may be mathematically expressed by the equation:

$$n\lambda = d(\sin\theta_i + \sin\theta_d) \tag{1}$$

where n is the order of diffraction, $\lambda$ is the prespecified wavelength of interest, d is the spacing between grooves of the grating element, and $\theta_i$ and $\theta_d$ are the angles of incidence and diffraction (with sign) as measured from the grating normal. For the n=0 diffraction order, we have $$\theta_i = -\theta_d \tag{2}$$

which is specular (Snell's Law) reflection and wavelength independent. For a grating element mounted in the Littrow (autocollimated) configuration, it is required that $\theta_i = \theta_d$ which implies $$n\lambda_i = 2d\sin\theta_i. \tag{3}$$

The above equation demonstrates that for any given $\lambda_i$, there is only one $\theta_i$ for which the laser radiation is reflected back upon itself (retroreflected) in the nth order. In the cases in which it is desired to have all radiation incident on the grating elements diffracted into either the n=0 or n=1 order, then the groove spacing d should be restricted to:

$$\lambda/2 < d < \lambda. \tag{4}$$

The key principle to the selected wavelength operation of the present embodiment resides in the anisotropy of the first order diffraction efficiency for the $\sigma$- and p-polarization states. Thus, the grating elements 22 and 24 may be ruled as described hereabove to satisfy the above restriction of equation (4) on groove spacing d with less than 5% first order diffraction efficiency for the p-polarization (i.e. parallel to the grooves of the grating element) and greater than 80% first order diffraction efficiency for the orthogonal $\sigma$-polarization, over a narrow wavelength range. It is understood that in order for these percentages to occur the grating elements 22 and 24 should be aligned as described in connection with the embodiment depicted in FIG. 1. It is straightforward to show that the feedback $F(\lambda_i)$, output coupling $O(\lambda_i)$, and loss $L(\lambda_i)$ for each wavelength $\lambda_i$ may be expressed in accordance with the following mathematical equations:

$$F(\lambda_1) = n_1^\sigma, \tag{5}$$

$$F(\lambda_2) = (1 - n_1^p)^2 n_2^\sigma, \tag{6}$$

$$O(\lambda_1) = (1 - n_1^\sigma)(1 - n_2^p), \tag{7}$$

$$O(\lambda_2) = (1 - n_1^p)(1 - n_2^\sigma), \tag{8}$$

$$L(\lambda_1) = 1 - F(\lambda_1) - O(\lambda_1), \text{ and} \tag{9}$$

$$L(\lambda_2) = 1 - F(\lambda_2) - O(\lambda_2) \tag{10}$$

where n is the diffraction efficiency of the grating element, the superscript represents the polarization state relative to the grating element, and the subscript represents the predetermined wavelength and hence the grating associated therewith.

Since the polarization modulator 20 is operative to select the $\sigma$- or p-polarization of the radiation beam that is provided to the grating elements, only one wavelength of the radiation beam is subjected to a high-Q condition in the laser cavity at a given time. For an electro-optically controlled device the polarization state may be dependent on whether the polarization modulator 20 is biased at the "zero-wave" or "half-wave" retardation voltage. Ostensibly then, alternating between preselected wavelengths $\lambda_1$ and $\lambda_2$ is limited only by the speed at which the electro-optical cell 20 modulates the polarization state of the radiation beam.

In the case in which low pressure $CO_2$ is the lasing medium, the design requirements for the grating elements 22 and 24 may be derived assuming that the optimum feedback is about 80%, the output coupling 15% and loss 5% for each wavelength $\lambda_i$. By substituting these figures into the above equations (5)–(10), the diffraction efficiencies for the diffraction elements 22 and 24 may be derived as follows:

$$\text{Grating 22:} \quad \left. \begin{array}{l} n_1^\sigma = .80 \\ n_1^p = .027 \end{array} \right\} \quad (11)$$

$$\text{Grating 24:} \quad \left. \begin{array}{l} n_2^\sigma = .846 \\ n_2^p = .25 \end{array} \right\} \quad (12)$$

In the present embodiment, nominal actual diffraction efficiencies for grating element 22 were:

$$\left. \begin{array}{l} n_1^\sigma \simeq .83, \text{ and} \\ n_1^p \simeq .02; \end{array} \right\} \quad (13)$$

and for grating element 24 were:

$$\left. \begin{array}{l} n_2^\sigma \simeq .85, \text{ and} \\ n_2^p \simeq .04. \end{array} \right\} \quad (14)$$

Figure 2:
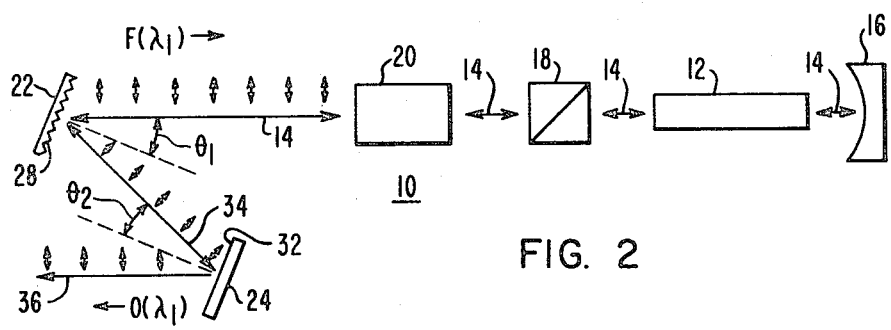
FIG. 2 is an operational illustration of the laser system embodiment of FIG. 1 in accordance with one laser beam polarization state.

A typical operation of the laser system embodiment may be described in connection with the illustrations of FIGS. 2 and 3. In the illustration of FIG. 2, the polarization modulator 20 is governed to modulate the polarized beam of light from the polarizer 18 into a polarization state which is orthogonal ($\sigma$-) to the grooves on the surface 28 of the diffraction element 22 and parallel (p-) to the grooves on the surface 32 of the diffraction element 24. This polarization state is denoted by the double-ended set of arrows shown above the optical path 14, reflective path 34, and output path 36. In this polarization state, feedback radiation $F(\lambda_1)$ having the wavelength $\lambda_1$, uniquely associated with the orientation angle $\theta_1$, is retroreflected along path 14 to cause the lasing medium to resonate at the wavelength $\lambda_1$. A smaller percentage of radiation having the wavelength $\lambda_1$ may be reflected from the grating element 22 along path 34 to the surface 32 of the other diffracting element 24. Since the polarization state of the radiation is parallel to the grooves of the diffraction element 24, the output radiation $O(\lambda_1)$ will be reflected along path 36 which is the output path of the laser system. Nominal figures for feedback and output at the wavelength $\lambda_1$ may be on the order of 83% and 16.3%, respectively, with a loss on the order of 0.7%.

In a second governing state, the polarization modulator may control the polarized light beam from the polarizer 18 to a polarization state which is parallel (p-) to the grooves of the diffraction element 22 and orthogonal ($\sigma$-) to the grooves of the diffraction element 24. This polarization state is denoted in FIG. 3 by the symbols x shown above the paths 14, 34, and 36. In this polarization state, the diffraction element 22 reflects a high percentage of the radiation along the path 34 to the diffraction element 24. However, since the polarization of the radiation reflected along path 34 is orthogonal to the grooves of the diffraction element 24, feedback radiation $F(\lambda_2)$ having the unique wavelength $\lambda_2$, associated with the orientation angle $\theta_2$, is retroreflected along paths 34 and 14 to the laser tube 12 to cause the lasing medium to resonate at the wavelength $\lambda_2$. The grating element 24 also permits the output radiation $O(\lambda_2)$ having wavelength $\lambda_2$ to be reflected along the path 36 which is the output emission path of the laser system 10. Nominal feedback and output figures for radiation of wavelength $\lambda_2$ may be on the other of 81.6% and 14.7%, respectively, with a loss on the order of 3.7%.

Figure 3:
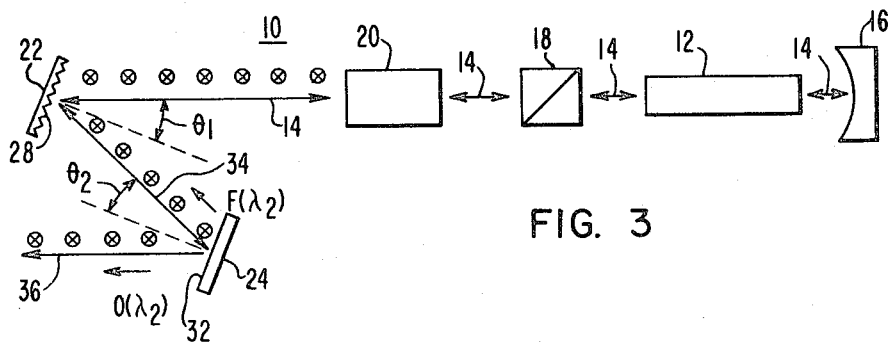
FIG. 3 is an operational illustration of the laser system embodiment of FIG. 1 in accordance with another laser beam polarization state.

In the foregoing descriptions of the illustrations in FIGS. 2 and 3, it is shown that by merely switching the polarization state of the radiation beam using a polarization modulator 20, the laser cavity may be rapidly tuned between predetermined wavelengths of laser beam radiation and cause the output laser beam emission over path 36 to be switched between the predetermined wavelengths, accordingly.

I claim:

1. A laser system rapidly tunable between at least two preselected laser wavelengths comprising:

a lasing cell having two ends and operative to emit a coherent beam of radiation therefrom along an optical path;

a mirror optically separated from one end of the lasing cell along the optical path for reflecting said radiation beam back along the optical path to said lasing cell;

means operative to rapidly modulate the emitted radiation beam between at least two polarization states;

a first reflecting means optically separated from the other end of said lasing cell along the optical axis and fixedly aligned to have a first predetermined incident angle with said polarized radiation beam, said first reflecting means being operative in response to incident radiation in one polarization state to retroreflect a first portion of said radiation beam at substantially one wavelength which is unique to said first predetermined incident angle and to specularly reflect a second portion of said radiation beam along a first path, and operative in response to incident radiation in another polarization state to specularly reflect said radiation beam along said first path; and a second reflecting means optically separated from said first reflecting means along said first path and fixedly aligned to have a second predetermined incident angle with the radiation beam reflected along said first path, said second reflecting means being operative in response to incident radiation in said other polarization state to retroreflect a third portion of said radiation beam at substantially another wavelength which is unique to said second predetermined incident angle and to specularly reflect a fourth portion of said radiation beam along a second path, and operative in response to incident radiation in said one polarization state to specularly reflect a fifth portion of said radiation beam along said second path, said retroreflected first and third portions of said radiation beam being sufficient to cause resonance at said one and another wavelengths, respectively, whereby when said emitted radiation beam is modulated in said one polarization state the laser system is tuned to said one wavelength and when said emitted radiation beam is modulated in said other polarization state the laser system is tuned to said other wavelength and whereby said modulating means is operative to rapidly modulate therebetween.

2. The laser system in accordance with claim 1 wherein the first and second reflective means comprises first and second diffraction gratings, respectively, each diffraction grating having a reflective surface of a multiplicity of grooves having a predetermined groove spacing based on the prespecified wavelength to be retroreflected thereby, said first diffraction grating aligned to have the reflective surface normal thereof angled at the first predetermined incident angle to the optical path incident thereupon, said second diffraction grating aligned to have the reflective surface normal thereof angled at the second predetermined incident angle to the first path incident thereupon; and wherein said modulating means includes means for modulating the radiation beam in one polarization state which is orthogonal to the grooves of the first diffraction grating and parallel to the grooves of said second diffraction grating, and in another polarization state which is parallel to the grooves of said first diffraction grating and orthogonal to the grooves of said second diffraction grating.

3. The laser system in accordance with claim 2 wherein the predetermined groove spacing d of each diffraction grating is within the range of $$\lambda/2 < d < \lambda$$

where $\lambda$ is the prespecified wavelength to be retroreflected thereby.

4. The laser system in accordance with claim 2 wherein the first and second diffraction gratings include diffraction efficiencies in accordance with the following set of operational equations:

$$F(\lambda_1) = n_1^\sigma,$$

$$F(\lambda_2) = (1-n_1^p)^2 n_2^\sigma,$$

$$O(\lambda_1) = (1-n_1^\sigma)(1-n_2^p),$$

$$O(\lambda_2) = (1-n_1^p)(1-n_2^\sigma),$$

$$L(\lambda_1) = 1 - F(\lambda_1) - O(\lambda_1),$$

and $$L(\lambda_2) = 1 - F(\lambda_2) - O(\lambda_2);$$

where $F(\lambda_1)$ and $F(\lambda_2)$ are the desired feedback radiation portions of the one and another wavelengths, respectively, $L(\lambda_1)$ and $L(\lambda_2)$ are the expected losses in radiation of the one and another wavelengths, respectively, $O(\lambda_1)$ and $O(\lambda_2)$ are the resulting output emissions of the one and another wavelengths, respectively, $n_1^\sigma$ and $n_1^p$ are the diffraction efficiencies of the first diffraction grating, the superscripts $\sigma$ and p representing the orthogonal and parallel polarization states, respectively, relative to the first grating element; and $n_2^\sigma$ and $n_2^p$ are the diffraction efficiencies of the second diffraction grating, the superscripts $\sigma$ and p representing the orthogonal and parallel polarization states, respectively, relative to the second grating element.

5. The laser system in accordance with claim 1 wherein the mirror is a totally reflective mirror and the output emission path of the laser system is along the second path.

6. The laser system in accordance with claim 5 wherein the totally reflective mirror is concave.

7. The laser system in accordance with claim 1 wherein the polarization modulating means comprises an electro-optic cell for modulating the polarization of the radiation beam at least between the one and another polarization states.

8. The laser system in accordance with claim 1 wherein the polarization modulating means comprises a Brewster angle window disposed at the other end of the laser cell for polarizing the emitted radiation beam; and an electro-optic cell for modulating the polarized radiation beam from one polarization state to another.

* * * * *